Figure 1:
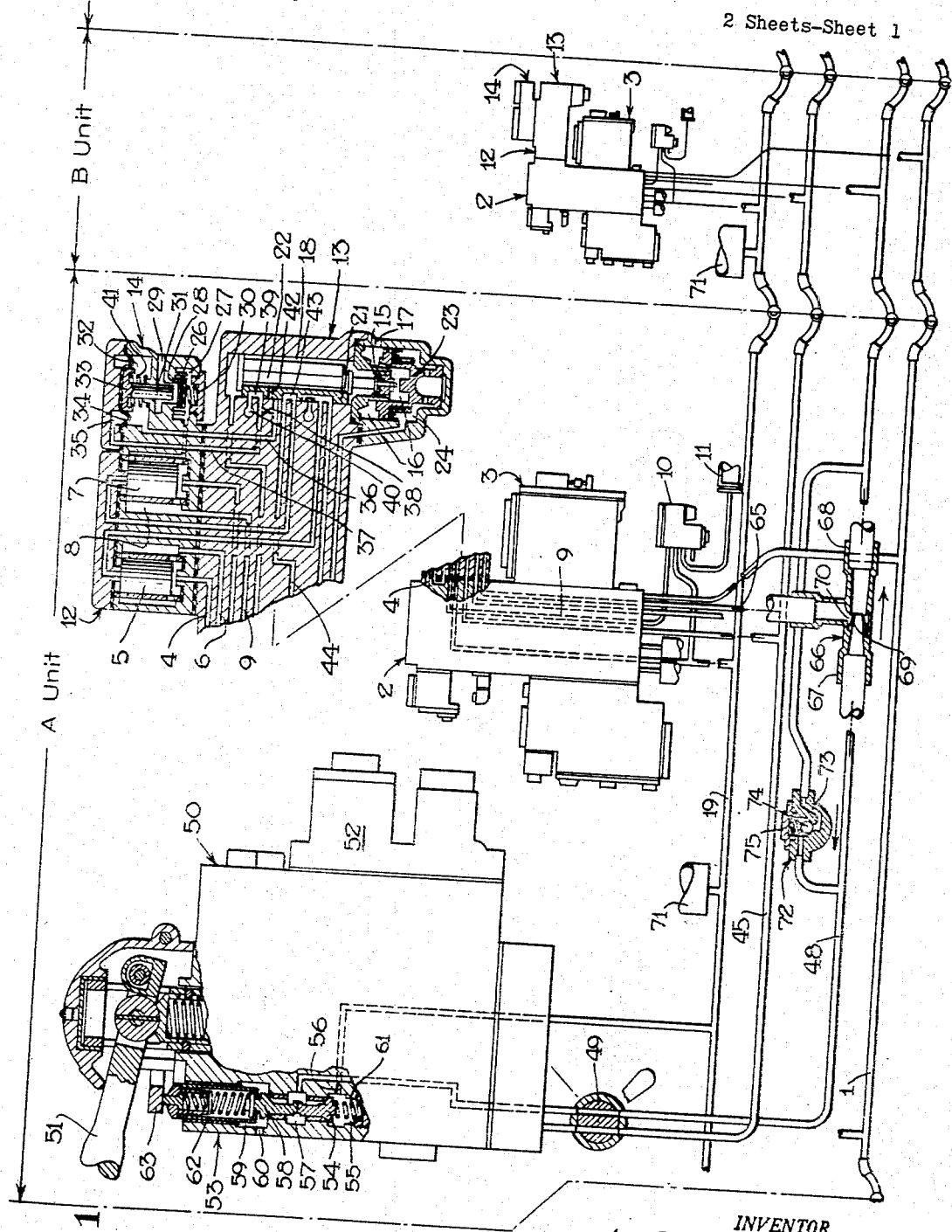

Aug. 25, 1953

A. T. GORMAN 2,650,137

RELEASE CONTROL APPARATUS FOR FLUID PRESSURE BRAKES

Filed Oct. 21, 1949

2 Sheets-Sheet 1

INVENTOR.
Andrew T. Gorman
BY

*Frank E. Miller*

ATTORNEY

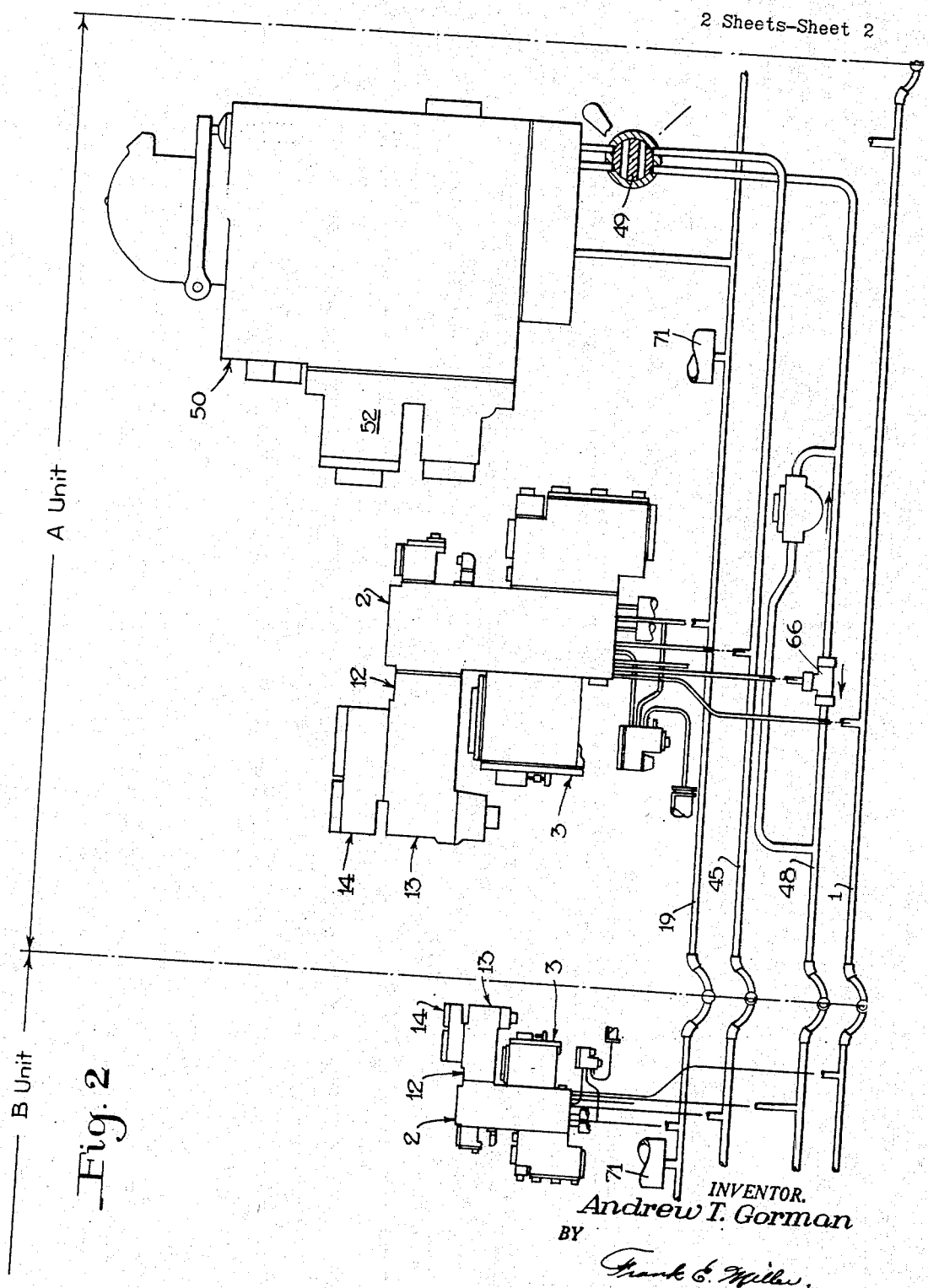

Patented Aug. 25, 1953

2,650,137

UNITED STATES PATENT OFFICE 2,650,137

RELEASE CONTROL APPARATUS FOR FLUID PRESSURE BRAKES

Andrew T. Gorman, Pitcairn, Pa., assignor to Westinghouse Air Brake Company, a corporation of Pennsylvania Application October 21, 1949, Serial No. 122,656

5 Claims. (Cl. 303—40)

This invention relates to fluid pressure brakes and more particularly to the type for use on railway locomotives.

As well known, it is customary in braking long freight trains to often release an automatic service application of fluid pressure brakes on the locomotive while retaining the automatic service application of fluid pressure brakes on the cars of a train in order to control slack in the train and also to prevent excessive wear, heating and possible loosening of the tires on the locomotive driver wheels.

The 24 RL Locomotive Brake Equipment shown and described in Westinghouse Air Brake Company's Instruction Pamphlet No. 5066 dated March 1948 is employed on modern diesel locomotives comprising a multiple of connected units usually including like, leading and trailing A units and one or more like intermediate B units. On each of these units there is provided a brake controlling valve device adapted to respond to a reduction in pressure in a brake pipe, extending through the several units of the locomotive for connection with the brake pipe on cars of a train, to apply the fluid pressure brakes on the respective unit when the fluid pressure brakes on the cars are applied. An independent release valve device is associated with each of the brake controlling valve devices for operation by fluid under pressure to release the brakes on the unit independently of the brake pipe and hence without necessitating releasing of brakes on the cars of the train. An actuating pipe extending through the several units of the locomotive is connected to an independent brake valve device on each of the A units through a cut-out valve which on the trailing A unit is closed. The independent brake valve device on the leading A unit is operative to a release position to supply fluid under pressure to the actuating pipe to cause operation of the independent release valve devices on the several units to release the fluid pressure brakes on the units as above mentioned.

In a multiple unit diesel locomotive the actuating pipe is relatively long, due to which, and also due to resistance to flow of fluid under pressure through said pipe, the pressure of fluid supplied to said pipe by the independent brake valve device on the leading A unit will increase much more rapidly on said leading unit than on the trailing A unit. As a result, the independent release valve device on the leading A unit will operate in response to pressure of fluid supplied to the actuating pipe to initiate a release of the fluid pressure brakes on the leading unit sooner than the independent release valve devices on the other units will respond to such pressure to initiate a release of the fluid pressure brakes thereon. This is satisfactory if the handle of the independent brake valve device is held in release position for the necessary, and relatively short, length of time required to effect a release of brakes on the trailing A unit at which time a release of brakes on all other units of the locomotive will have occurred. However, if the independent brake valve handle is held in its release position only long enough to effect a desired release of the fluid pressure brakes on the leading A unit, and which release will be indicated by a gage in the locomotive cab connected to the brake cylinder device on such unit, and is then moved out of release position for venting the actuating pipe, all of the independent release valve devices throughout the locomotive will move out of their brake release positions at a time when the brakes on the units to the rear of the leading A unit may be only partially released, since they will not start to release as soon as the brakes on the leading A unit. In fact, if the independent brake valve device is operated to and then out of its release position for releasing the locomotive brakes in steps, observed by the pressure gage connected to the brake cylinder device of the leading A unit, it is possible to effect a full release of brakes on said A unit without obtaining any release of brakes on the trailing A unit.

The principal object of the invention is therefore the provision of means for insuring, under conditions such as above described, that an automatic fluid pressure application of brakes on all units of a multiple unit locomotive will release as desired, in response to release operation of an engineer's independent brake valve device on the leading A unit, and this object is attained by the provision of means adapted to be added to the 24 RL Locomotive Brake Equipment for automatically delaying the release of brakes on the leading A unit of the locomotive, in response to operation of the independent brake valve device thereon, to such an extent that such release will occur substantially in unison with the release of the fluid pressure brakes on the trailing A unit, and since the brakes on the intermediate unit or units will release at least as fast as those on the trailing A unit, the desired release of brakes on all units of the locomotive will be assured.

Other objects and advantages will become apparent from the following more detailed description of the invention.

In the accompanying drawings: Figs. 1 and 2, when the right hand edge of Fig. 1 is matched to the left hand edge of Fig. 2 is a diagrammatic view of a fluid pressure brake equipment embodying the invention and for use on a multiple unit locomotive comprising two end A units and two intermediate B units connected to each other and to said end units.

Description

As shown in the drawing, the fluid pressure brake equipment for the different units of the locomotive are separated from each other by dot and dash lines and the legends "A unit" are applied to the equipment which will be carried by the leading and trailing units of the locomotive while the legends "B unit" are applied to the intermediate units. The brake equipment employed on the several units may be generally like that disclosed and described in Patent No. 2,173,940, issued to E. E. Hewitt et al. on September 26, 1939, modified as in Patent No. 2,464,977, issued to A. T. Gorman on March 22, 1949, and also like that disclosed in the Instruction Pamphlet hereinbefore referred to, in view of which the disclosure in the drawing and the following description thereof have been limited to only such as deemed necessary to a clear understanding of the invention.

As shown in the drawing, the brake equipment for the locomotive comprises a brake pipe 1 extending through the locomotive for connection with the brake pipe on a train of cars at either end of the locomotive, depending upon which end is the leading end. An automatic brake valve device (not shown) adapted to be carried by each of the A units and to be connected to the brake pipe 1 is operative in the usual manner to effect a reduction in pressure in brake pipe 1 to effect an application of brakes on the locomotive (and cars of a train) as will be subsequently described, and to also recharge said brake pipe for releasing such application, in well known manner.

On each of the locomotive units there is provided a brake controlling valve device 2 comprising a service application valve device 3 adapted to respond to a service reduction in pressure in brake pipe 1 for supplying fluid at a proportional pressure to a passage 4 from which it is adapted to flow past the lower end of a double check valve 5 to a passage 6 and thence past the lower end of a double check valve 7 to an annular chamber 8 and thence through a passage 9 to a relay valve device 10 which is adapted to respond thereto to provide, from a main reservoir pipe 19, fluid at a corresponding pressure in a brake cylinder device 11 for applying the brakes on the respective unit. When the fluid pressure brakes on each of the units of the locomotive have thus been applied to a degree proportional to the reduction of pressure in the brake pipe 1, the service application valve device 3 will assume a lap position, as well known, for bottling the fluid pressure in relay valve device 10 and thereby in the brake cylinder device 11.

The main reservoir pipe 19 may extend through the locomotive and on each unit be connected to a main reservoir 71 adapted to be supplied in the usual manner with fluid at the pressure normally employed on locomotives.

Associated with each of the brake controlling valve devices 2 is an interlock valve device 12 comprising, in addition to the double check valves 5 and 7, a selector valve device 13 and an independent brake release valve device 14.

Each selector valve device 13 comprises a piston 15 open at one side to a chamber 16 in constant communication with atmosphere through a vent port 17 and open at the opposite side to a valve chamber 18 adapted to be constantly supplied with fluid under pressure from the main reservoir pipe 19. A slide valve 21 contained in valve chamber 18 is connected by stem 22 to the piston 15 for movement therewith. The selector valve device further comprises a piston 23 of greater area than and arranged in coaxial relation to piston 15 and subject on one side to atmospheric presure in chamber 16 and on the opposite side to pressure of fluid in a chamber 24. When chamber 24 is vented pressure of fluid in chamber 18 will move the piston 15 and thereby the slide valve 21 to a normal position in which they are shown in the drawing. When fluid under pressure is supplied to chamber 24, piston 23 being of greater area than piston 15, will move against said piston 15 and then actuate said piston 15 and the slide valve 21 to an independent brake release position.

Each independent release valve device 14 comprises a check valve 26 contained in a chamber 27 which is open to the annular chamber 18 encircling the double check valve 7 and thereby to passage 9 connected to the relay valve device 10. The check valve 26 is arranged to cooperate with a seat 28 in the casing for closing communication between chamber 27 and an atmospheric vent port 29, a spring 30 contained in chamber 27 acting on the check valve 26 for urging it into contact with said seat. Slidably mounted in a bore in the casing and extending through the passage 29 for engagement with the seated side of check valve 26 is a stem 31 extending into a chamber 32 wherein its end is provided with a follower head 33 engaging one side of a flexible diaphragm 34. At one side of the diaphragm 34 is chamber 32 while at the opposite side is a chamber 35. The chambers 32 and 35 are connected, respectively, by passages 36 and 37 to the seat of the slide valve 21 and said passages are connected to each other through a choked communication 38.

The slide valve 21 has a cavity 39 which, in the normal position of said valve, opens passage 37 to an atmospheric vent port 40, the chamber 32 being also vented at this time through the choked communication 38 and passage 37. With the chambers 32 and 35 thus vented, a spring 41 contained in chamber 32 and acting on the follower head 33 will deflect the diaphragm 34 and move the stem 31 to the position in which they are shown in the drawing and in which said stem is out of contact with the check valve 26 to permit closing thereof by the spring 30. With the check valve 26 thus closed, fluid supplied by the service application valve device 3 to operate the relay valve device 10 for effecting an application of brakes on the locomotive unit will be held against dissipation through the atmospheric port 29.

When by operation of piston 23 in response to fluid pressure in chamber 24, the slide valve 21 is moved out of its normal position, in which it is shown in the drawing, to its brake release position a port 42 in said slide valve will move into registry with passage 37 and open said passage to valve chamber 18, as a result of which, fluid under pressure from said valve chamber will flow to passage 37 and thence to diaphragm chamber 35. When fluid under pressure is thus supplied to passage 37 some fluid will flow therefrom through the choked communication 38 to passage 36 but the latter passage is open at this time through a cavity 43 in the slide valve 21 to a passage 44 connected to an application and release pipe 45 extending through the locomotive and which will be vented. As a result, sufficient pressure will be promptly obtained in diaphragm chamber 35 over that in chamber 32 to deflect diaphragm 34 against spring 41 to thereby actuate stem 31 to unseat the check valve 26. With the fluid pressure brakes on the locomotive unit applied by operation of the service application valve device 3 which will now be in lap position, the unseating of check valve 26 will allow the actuating fluid pressure in the relay valve device 10 to be vented to atmosphere through the atmospheric port 29 whereupon said relay valve device will operate to release the fluid under pressure from the brake cylinder device 11 for effecting a release of the brakes on the locomotive unit.

It will be noted, therefore, that an automatic application of fluid pressure brakes on the locomotive unit effected in response to a reduction of pressure of fluid in brake pipe 1 and consequent operation of the service application valve device 3 may be released independent of the brake pipe 1 and hence independent of the brakes on cars of a train by supply of fluid under pressure to piston chamber 24 of the selector valve device 13.

An actuating pipe 48, as well as the application and release pipe 45, extends through the several units of the locomotive and on each of the A units both of said pipes are connected through a cut-out valve 49 to an independent brake valve device 50. On the leading A unit of the locomotive the cut-out valve 49 will open communication between pipes 45 and 48 and the respective independent brake valve device 50 while on the trailing A unit said valve will close said communication.

In the drawing it is assumed that the A unit of Fig. 1 is the leading unit of the locomotive and the cut-out valve 49 associated with this unit is therefore shown in its communication opening position, while it is assumed that the A unit shown in Fig. 2 of the drawing is the trailing unit of the locomotive and on this trailing unit the cut-off valve 49 is shown in its communication closing position.

Each engineer's independent brake valve device 50 comprises an engineer's control handle 51 movable in a horizontal plane to control operation of a self-lapping supply and release valve mechanism 52 for varying pressure of fluid in the application and release pipe 45 to effect, via of the respective selector valve device 13 when in its normal position, independent application and release of locomotive brakes in a manner fully disclosed in the above referred to patent and in view of which a description thereof is not believed essential in the present application, it being merely desired to point out that with the brake valve handle 51 in its normal running position, in which it is shown in the drawing, the application and release pipe 45 will be vented. The handle 51 of each independent brake valve device 50 is also operable by vertical movement to control an independent release valve device 53.

Each independent release valve device 53 comprises a supply valve 54 contained in a chamber 55 constantly supplied with fluid under pressure by way of a passage 56 from the main reservoir pipe 19, said valve being arranged to control flow of fluid under pressure from said chamber to a chamber 57 which is open to the actuating pipe 48. The independent release valve device further comprises a valve 58 for controlling communication between chamber 57 and a chamber 59 which is open to atmosphere through a vent 60, the two valves 54 and 58 having fluted stems engaging each other in chamber 57 so that the valves will move in unison. A spring 61 contained in chamber 55 acts on the valve 54 for urging it to its closed position and for at the same time opening the valve 58. A spring and plunger means 62 connect the valve 58 to a vertically movable element 63 arranged to be engaged by depression of handle 51 for seating the valve 58 and unseating the valve 54. When the handle 51 is released of manual pressure the two valves 54, 58 will under the action of spring 61 assume the position in which they are shown in the drawing and in which the actuating pipe 48 is vented.

It will now be seen that when the handle 51 of the independent brake valve device 50 on the leading A unit of the locomotive is depressed to close valve 58 and open valve 54 in the respective brake valve device, fluid under pressure will be supplied to the actuating pipe 48 throughout the length of the locomotive and on each locomotive unit fluid from said pipe will flow through a passage and pipe 65 to piston chamber 24 in the interlock valve device 12 and operate the selector valve device 13 to its independent brake release position for effecting operation of the independent release valve device 14 to release the brakes on the locomotive unit. It will thus be apparent that after an automatic service application of brakes has been effected on the locomotive by operation of the service application valve device 3 in response to a service reduction in pressure in the brake pipe 1, such application may be released by depressing of the independent brake valve handle 51 on the leading unit of the locomotive. It will also be seen that upon release of handle 51 the actuating pipe 48 will be vented to permit return of the selector valve devices to normal position to provide for control of brakes on the locomotive through the medium of the application and release pipe 45 by operation of the self-lapping portion of the brake valve device.

The structure and operation of the brake equipment so far described is the same as in the above referred to references, it being desired to point out however that since the supply of fluid to the actuating pipe 45 occurs on the leading A unit of the locomotive, the pressure in said pipe required for operating the interlock valve devices 12 on the different units will be obtained first on the leading A unit and then serially on the other locomotive units toward the rear with the possibility of the undesirable results hereinbefore mentioned.

According to the invention, I interpose in the connection between the actuating pipe 48 and the pipe 65 on each of the A units of the locomotive a one-way acting Venturi choke device 66 with the up-stream end 67 of said device connected to the portion of the actuating pipe 48 leading to the respective independent brake valve device and with its down-stream end 68 connected to the portion of the actuating pipe extending toward the intermediate B units of the locomotive. Encircling the choke or throat 69 of the Venturi device 66 is an annular suction chamber 70 to which the pipe 65 is connected. It will be noted that the two Venturi devices 66 on the two end A units of the locomotive are arranged opposite to each other, that is, with the down-stream ends toward each other.

With the Venturi devices 66 applied to the locomotive brake equipment, as just described, when the independent brake valve device 50 on the leading A unit of the locomotive is operated to supply fluid under pressure to the actuating pipe 48 the flow of fluid through the choke 69 in the Venturi device 66 on the respective unit will in effect create a suction in the connected chamber 70 and pipe 65 and thereby delay the build up of pressure therein and thereby in piston chamber 24 of the interlock valve device 12 on said unit, while on the trailing A unit where the flow of fluid will be into the down-stream end 68 of the respective Venturi device 66 the pressure of fluid in the pipe 65 on that unit will increase with that in the actuating pipe 48. On the leading A unit of the locomotive the consequent delay in pressure build-up in the pipe 65 and in piston chamber 44 of the respective interlock valve device 12 is such as to prevent sufficient pressure being obtained in said chamber to actuate said device to its independent brake release position until sufficient pressure is built up in the corresponding chamber on the trailing A unit to actuate the interlock valve device 12 thereon to its independent brake release position. Thus by use of the one-way acting Venturi choke devices 66 arranged as above described release of an automatic application of fluid pressure brakes on the trailing A unit of the locomotive will start at substantially the same time as on the leading A unit while the release of brakes on the intermediate B unit or units will occur at least as soon as on the trailing A unit. Therefore when an independent release of the fluid pressure brakes on the leading A unit is effected a like release of brakes on all other units of the locomotive will be assured.

In order to return the selector valve devices 13 on the locomotive to their normal position to provide for control of brakes by the independent brake valve device 50 through the medium of the application and release pipe 45, manual pressure on handle 51 will be released to permit return of said handle to its elevated position for releasing fluid under pressure from the actuating pipe 48. It is desired that all of the selector valve devices 13 return to their normal position at substantially the same time and this will be obtained due to the choking effect of throat 69 in the Venturi device 66 on the control unit.

To move the selector valve devices 13 to their independent brake release position the pressure of fluid provided in the respective piston chambers 24 is that in the main reservoir pipe 19 and greatly in excess of that in said chamber at which the pistons 15 under pressure of fluid in valve chambers 18 will return the selector valve devices to normal position. In order to dissipate this excess pressure as quickly as possible I therefore provide on each "A" unit a check valve device 72 arranged in by-passing relation to the Venturi device 66.

Each check valve device 72 comprises a passageway 73 of greater flow capacity than the throat 66 of the Venturi devices for permitting flow of fluid under pressure from the actuating pipe in the direction of the respective independent brake valve device 50. A check valve 74 closes communication through the passageway upon flow of fluid under pressure from the respective brake valve device to the actuating pipe 48 for rendering the Venturi choke effective as above described. A spring 75 acts on the check valve 74 to seat it against a pressure in the portion of the actuating pipe connected to the selector valve devices 13 which is just slightly in excess of that at which said devices will return to normal position. It will therefore be seen that when the independent brake valve handle 51 is released of depressing force to vent the actuating pipe, the excess pressure in said pipe will be promptly dissipated whereupon the check valve 74 on the respective unit will be seated to cause further release to occur through the throat of the respective Venturi device 66, whereby the several selector valve devices will be returned to their normal positions as quickly as possible and at substantially the same time.

If the control ends of the locomotive are changed, the cut-out valves 49 will be adjusted as hereinbefore described and the Venturi device 66 and check valve device 72 at the new control A unit will operate to accomplish the same results as those on the other A unit when it constituted the control unit, as will be apparent from the above description.

It will be noted that the two Venturi devices 66 and check valve devices 72 are required only when the locomotive embodies two A units for operation of the locomotive in either direction. If it comprised only one A unit for operation always in the same direction, only the Venturi device 66 and check valve device 72 on the single A unit would be necessary.

*Summary*

It will now be seen that I have provided means whereby in response to operation of the independent brake valve device on the leading unit of a multiple unit locomotive to effect the release of the brakes independent of the pressure of fluid in the brake pipe 1, a release on all of the units of the locomotive will be assured regardless of operation of the brake valve handle.

Having now described the invention what I claim as new and desire to secure by Letters Patent is:

1. In a fluid pressure brake equipment for a multiple unit locomotive, in combination, a pipe adapted to extend the length of the locomotive, an engineer's control valve device on the leading one of said units for supplying fluid under pressure to said pipe, a Venturi device in said pipe on said leading unit through which fluid under pressure supplied by said control valve device flows to said pipe on the other unit, an independent brake release device on each of said units operable by fluid under pressure to effect a release of brakes thereon, a pipe on the leading unit connecting the independent brake release device thereon to the suction of said Venturi device thereon to the suction of said Venturi device, and means on the other units subjecting the independent brake release devices thereon directly to pressure of fluid in said pipe thereon.

2. In a fluid pressure brake equipment for a multiple unit locomotive, in combination, a pipe adapted to extend through the locomotive, an engineer's control valve device on each of the leading and trailing units of said locomotive for supplying fluid under pressure to the respective end of said pipe, a one-way acting Venturi device on each of said leading and trailing units disposed in said pipe with its up-stream end connected to the engineer's control valve device on the respective unit and through which fluid under pressure supplied by the respective engineer's control valve device is adapted to flow to said pipe on the other units, an independent brake release device on each of said units operable by fluid under pressure to effect a release of brakes thereon, and means connecting the brake release device on each of said leading and trailing units to suction of the respective Venturi device.

3. In a fluid pressure brake equipment for a multiple unit locomotive in combination, a brake pipe adapted to extend through the length of the locomotive, a brake controlling valve device on each unit operable upon a reduction of pressure in said brake pipe to supply fluid under pressure to effect an application of brakes on the respective unit, independent brake release means on each unit operable by fluid under pressure to release the fluid under pressure supplied by said application valve device to effect a release of brakes on the unit, a second pipe adapted to extend through the locomotive, an independent engineer's brake valve device on the leading one of the units for supplying fluid under pressure to said second pipe, a Venturi device on said leading unit through which fluid under pressure supplied by said independent brake valve device flows to said second pipe on the other units, means connecting said independent release means on said leading unit to the suction of said Venture device, and means connecting said independent release means on said other units directly to said second pipe.

4. In a fluid pressure brake equipment for a multiple unit locomotive, in combination, a brake pipe adapted to extend through the length of the locomotive, a brake controlling valve device on each unit operable upon a reduction of pressure in said brake pipe to supply fluid under pressure to effect an application of brakes on the respective unit, independent brake release means on each unit operable by fluid under pressure to release the fluid under pressure supplied by said application valve device to effect a release of brakes on the unit, a second pipe adapted to extend through the locomotive, an independent brake valve device on each of the leading and trailing units of said locomotive for individually supplying fluid under pressure to said second pipe, means for selectively rendering either one of said independent brake valve devices either effective or ineffective to supply fluid under pressure to said second pipe, a Venturi device on each of said leading and trailing units disposed in said second pipe and through which fluid under pressure supplied by the respective independent brake valve device flows to said second pipe on the other units, each of said Venturi devices comprising a choke and a suction chamber open to the down-stream side of said choke, and means connecting said independent release means on each of said leading and trailing units to the suction chamber of the respective Venturi device.

5. In combination, two devices each movable to one position in response to a chosen pressure of fluid and to another position in response to a lower pressure of fluid, a source of fluid at a pressure in excess of said chosen pressure, a pipe, a Venturi device disposed in said pipe to control flow of fluid under pressure therethrough, means connecting the suction of said Venturi device to one of said devices, means for subjecting the other of said two devices to pressure of fluid in a portion of said pipe spaced away from the down stream end of said Venturi device, a control device for connecting the portion of said pipe connected to the upstream end of said Venturi device to either said source or to a vent, a passageway having greater flow capacity than for flow of fluid under pressure through said pipe in the direction to said control device, valve means controlling communication through said passageway and subject to and operative by pressure of fluid in said pipe at said downstream end of said Venturi device to open said communication, and spring means for actuating said valve means to close said communication against said chosen pressure and for all lesser pressures of fluid in said pipe at the downstream end of said Venturi device.

ANDREW T. GORMAN.

References Cited in the file of this patent

UNITED STATES PATENTS

| Number | Name | Date |
|---|---|---|
| 1,923,141 | Farmer | Aug. 22, 1933 |
| 2,182,047 | Eaton | Dec. 5, 1939 |